United States Patent [19]

Gnjatovic

[11] Patent Number: 5,257,929
[45] Date of Patent: Nov. 2, 1993

[54] METHOD FOR INSULATING A FURNACE AND FURNACE MANUFACTURED ACCORDING TO THE METHOD

[76] Inventor: Milutin Gnjatovic, Keizerstraat 38c, NL-2584 BK Den Haag, Netherlands

[21] Appl. No.: 721,627
[22] PCT Filed: Jan. 18, 1990
[86] PCT No.: PCT/NL90/00008
    § 371 Date: Aug. 22, 1991
    § 102(e) Date: Aug. 22, 1991
[87] PCT Pub. No.: WO90/08297
    PCT Pub. Date: Jul. 26, 1990

[30] Foreign Application Priority Data

Jan. 18, 1989 [NL] Netherlands ............... 8900114

[51] Int. Cl.⁵ ............................................. F27D 3/00
[52] U.S. Cl. ..................................... 432/245; 432/238; 110/336
[58] Field of Search ............... 110/336, 335; 432/248, 432/251, 245

[56] References Cited

U.S. PATENT DOCUMENTS

| | | | |
|---|---|---|---|
| 4,088,825 | 5/1978 | Carr | 110/336 |
| 4,398,474 | 8/1983 | Berg | 110/336 |
| 4,452,587 | 6/1984 | Laws et al. | 432/245 |
| 4,595,358 | 6/1986 | Ginzburg | 432/65 |
| 4,669,242 | 6/1987 | Johnson et al. | 52/404 |
| 4,698,948 | 10/1987 | Yamashita et al. | 110/336 |
| 4,709,643 | 12/1987 | Moreno et al. | 110/336 |
| 4,734,031 | 3/1988 | Hughes | 432/248 |
| 4,791,769 | 12/1988 | Miller | 110/336 |
| 4,829,734 | 5/1989 | Schraff | 110/336 |
| 4,928,466 | 5/1990 | Alexander | 110/336 |

FOREIGN PATENT DOCUMENTS

3236646 4/1984 Fed. Rep. of Germany .
3327851 2/1985 Fed. Rep. of Germany .

OTHER PUBLICATIONS

Cahiers d'Informations Techniques de la revue de Metallurgie, vol. 80, No. 3, Mar. 1983 (Paris, FR), M. Puillet et al.: "Caracterisation physico-chimique des materiaux refractaires fibreux" pp. 237-253, see page 240.

Primary Examiner—Henry C. Yuen
Attorney, Agent, or Firm—Webb, Burden, Ziesenheim & Webb

[57] ABSTRACT

A furnace for high temperature, for example a glass furnace, is insulated thermally by arranging layers of material on the interior wall of the furnace shell. On the layers ceramic fibre material and a heat reflecting surface layer are arranged. According to the invention, the heat reflecting surface layer is arranged by a substance containing silicon. By subjecting the furnace to great heat and cooling it rapidly thereafter, a heat reflection is obtained in the micro-structure of the ceramic fibre. The substance may for example be water-glass. According to the invention, the fibre material is arranged in vertical blocks of trapezium form, then pressed and strapped up. After all blocks have been placed, one removes the strapping so that the blocks expand.

5 Claims, 6 Drawing Sheets

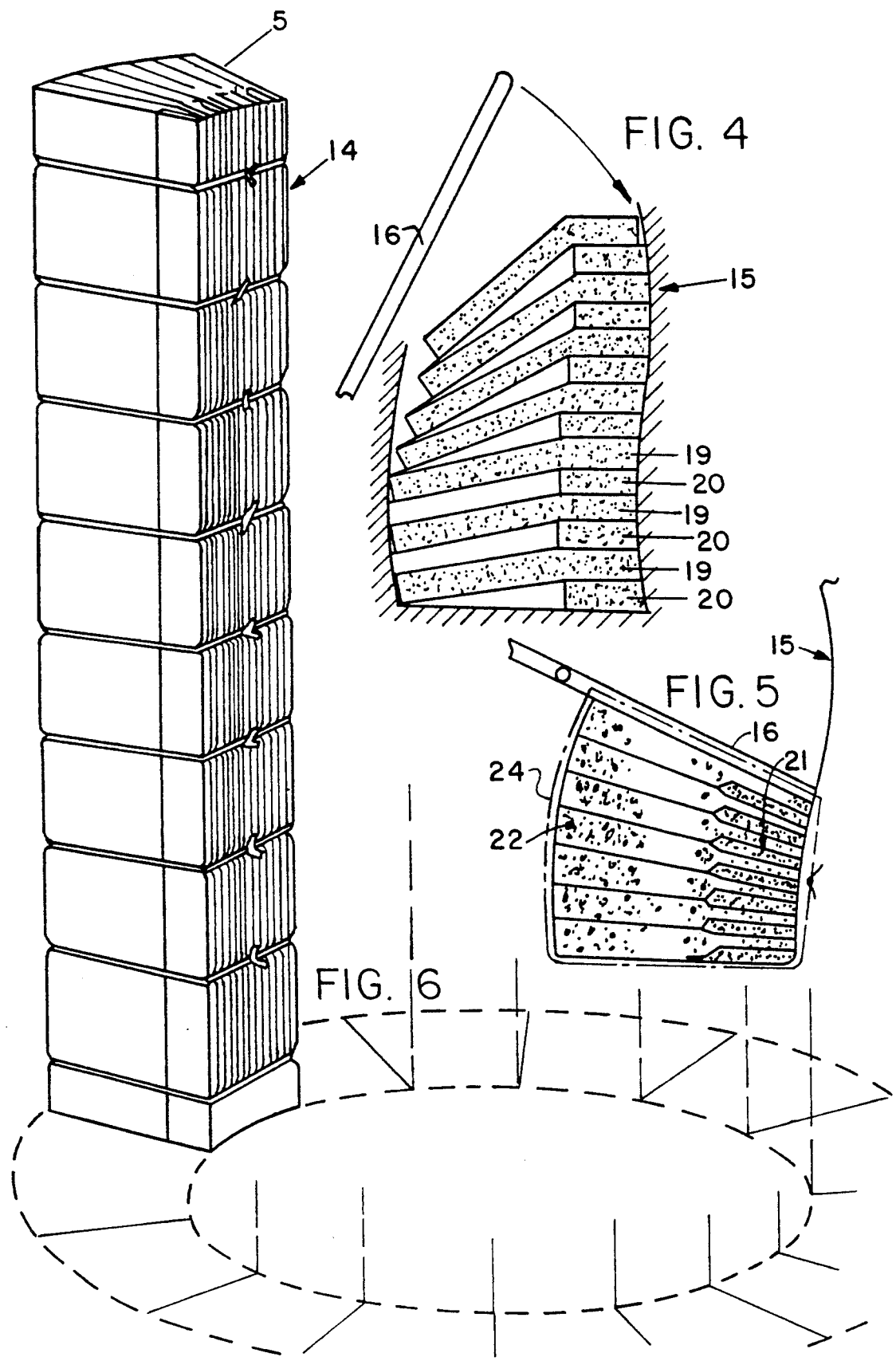

METHOD FOR INSULATING A FURNACE AND FURNACE MANUFACTURED ACCORDING TO THE METHOD

BACKGROUND OF THE INVENTION

The invention relates to a method for thermal insulating of a furnace for high temperature, for example a glass melting furnace, and a furnace manufactured in accordance with this method.

In a glass melting furnace a temperature of approximately 1500° C. is reached. Glass furnaces have usually consisted up to the present of a mortar laid brick wall which is lined on the inside with thermally insulating material. The brick wall serves not only as insulator but also as support frame for the insulating material. Such a wall has to be made on site for the user. It is not possible to manufacture this furnace in a factory and then transport it to the location of use. The furnaces are usually of a size such that there is space therein for various glass pots, in which the glass is melted. Such furnaces are expensive and have a limited output.

From U.S. Pat. Nos. 4,595,358 and 4,709,643 a method is known for thermal insulating of a furnace for high temperature, for example a glass furnace, comprising the steps of:

a. the arranging on the interior wall of the furnace shell of layers of insulating material, b. the applying to these layers of ceramic fiber material, and c. the arranging on the inward facing surface of said ceramic fiber material of a heat reflecting surface layer.

It is the object of the invention to provide a furnace that is light in construction, can be manufactured on factory premises and which, in view of its construction and weight, can be transported easily.

SUMMARY OF THE INVENTION

In accordance with the invention this is achieved by the features according to claim 1.

The furnace insulated in this way can be light because the furnace shell can be of sheet metal. Through the arrangement of the heat reflecting surface layer a heat reflection is obtained in the micro-structure of the ceramic fiber, while the body of the module of the ceramic fiber otherwise remains soft and preserves its thermal insulating value.

The heat reflecting surface layer can be arranged by applying a substance containing silicon, by then greatly heating the furnace and cooling it rapidly thereafter. Thus achieved is that only a surface layer in the micro-structure melts and becomes hard after cooling, while the rest of the fiber material remains soft and therefore preserves the thermal insulating transfer properties.

The reflecting surface layer is aplied by heating the furnace to approximately 1500° C. and by then cooling it down to about 1250° C. The silicon holding substance may for example be a sort of water-glass.

The heat reflecting layer is fire resistant.

The ceramic fiber material is not in itself self-supporting without steps being taken to achieve this. In accordance with the invention the fiber material is arranged on the side wall of a cylindrical furnace using the following steps:

a. fiber material is pressed and strapped up into vertical blocks of trapezium form section, b. blocks formed as according to step a. are disposed abutting one another against the cylindrical inner wall such that the whole inner surface is covered, and c. the strapping of the individual blocks is removed and the blocks allowed to expand.

Thus achieved is that the blocks of cylindrical material, after the removal of the strapping and expansion resulting from the opposing forces generated by the pressing, come to lie stiffly against one another and joins between the blocks which could cause thermal leakage are closed.

The furnace is preferably a cylinder open to the bottom which is placed loose on a base plate and whereby the cylinder and the base plate are insulated in the manner as described in the foregoing.

The open cylinder thus functions as a kind of hat which can easily be removed from the base plate. This yields the advantage that the glass pot can be taken very easily and quickly out of the furnace and placed therein by lifting the hat and setting it in inclined position.

The layers of insulating material are arranged overlapping to prevent thermal leakage.

As material for the back up insulating layers Microtherm ® can be used, while the ceramic fiber material can be Fiberfrax ® which is supplied by The Carborundum Company, Niagara Falls, N.Y.

The blocks can be pressed from parallel strips of material, whereby in the zone to be pressed into the convex side of the block of trapezium form section are arranged additional strips of material. As a result the density on the hot side is greatly increased.

The invention will now be further elucidated with reference to the drawings.

BRIEF DESCRIPTION OF THE PREFERRED EMBODIMENTS

In the drawings:

FIG. 4 and 5 are views of the pressing operation,

FIG. 6 shows a strapped block of pressed ceramic fiber material,

DETAILED DESCRIPTION OF THE PREFERRED EMBODIMENTS

Figure 1:
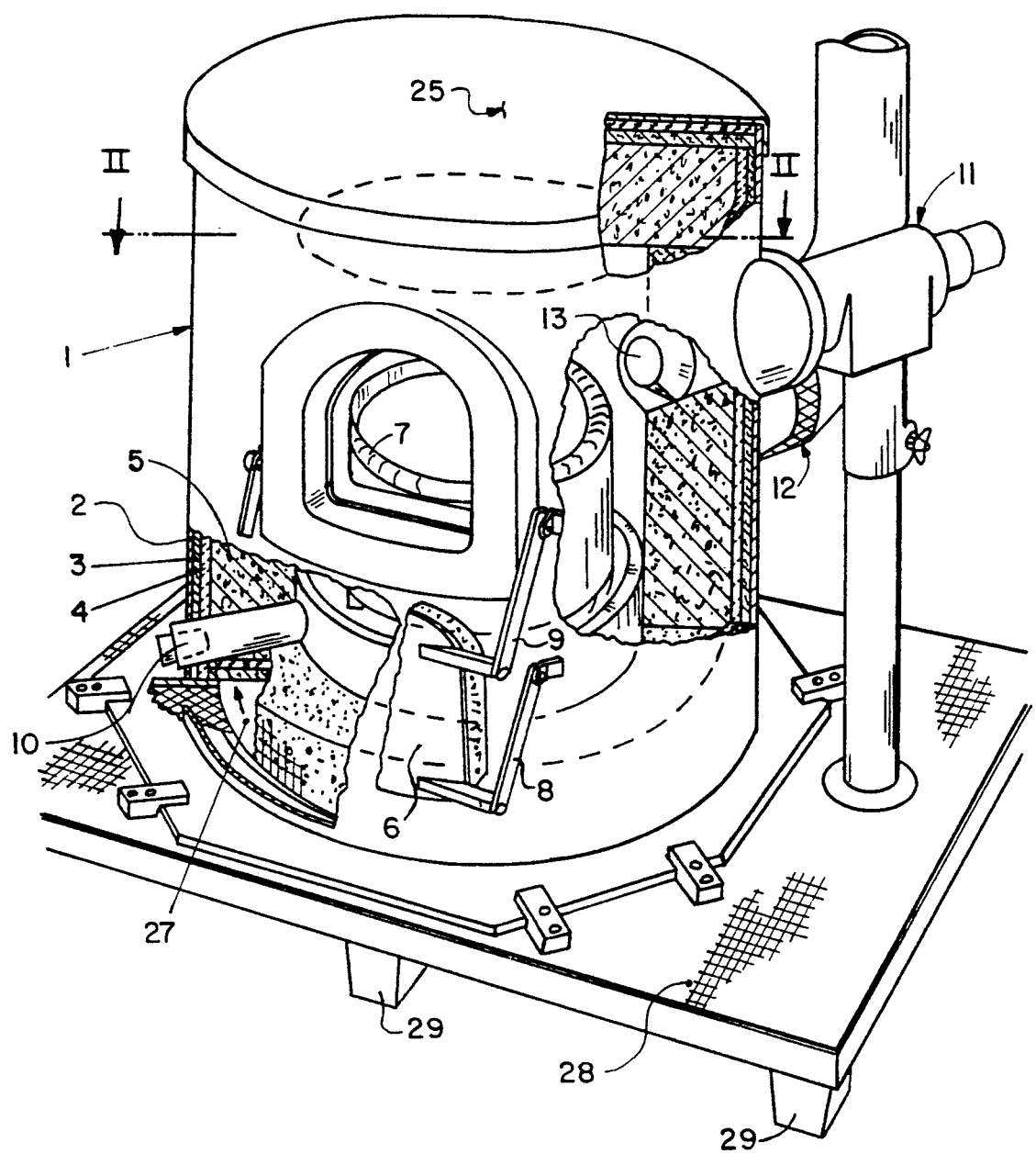
FIG. 1 shows a perspective view of a furnace according to the invention.

The furnace 1 consists of a cylindrical metal shell 2, layers 3, 4 of insulating material, for example Microtherm, arranged therein so as to be overlapping, and blocks of Fiberfrax 5 which is supplied by The Carborundum Company, Niagara Falls, N.Y. In the normal manner the furnace contains a door 6 for removal of melted glass from the glass pot 7. Using the parallelogram mechanism 8, 9 the door 6 is movable between a closed position and the folded down open position illustrated. The furnace further displays an outlet 10 on the underside for discharge of leakage glass. Likewise connected to the furnace is the burner installation 11 which is for instance gas fired. Also present is a connection 12 for joining to a flue uptake for discharge of combustion gases. The feed 13 for hot air debouches into the furnace such that the hot air flows run tangentially to the glass pot 7. The air flow moves in circles round the glass pot and heats it in efficient manner.

Figure 2:
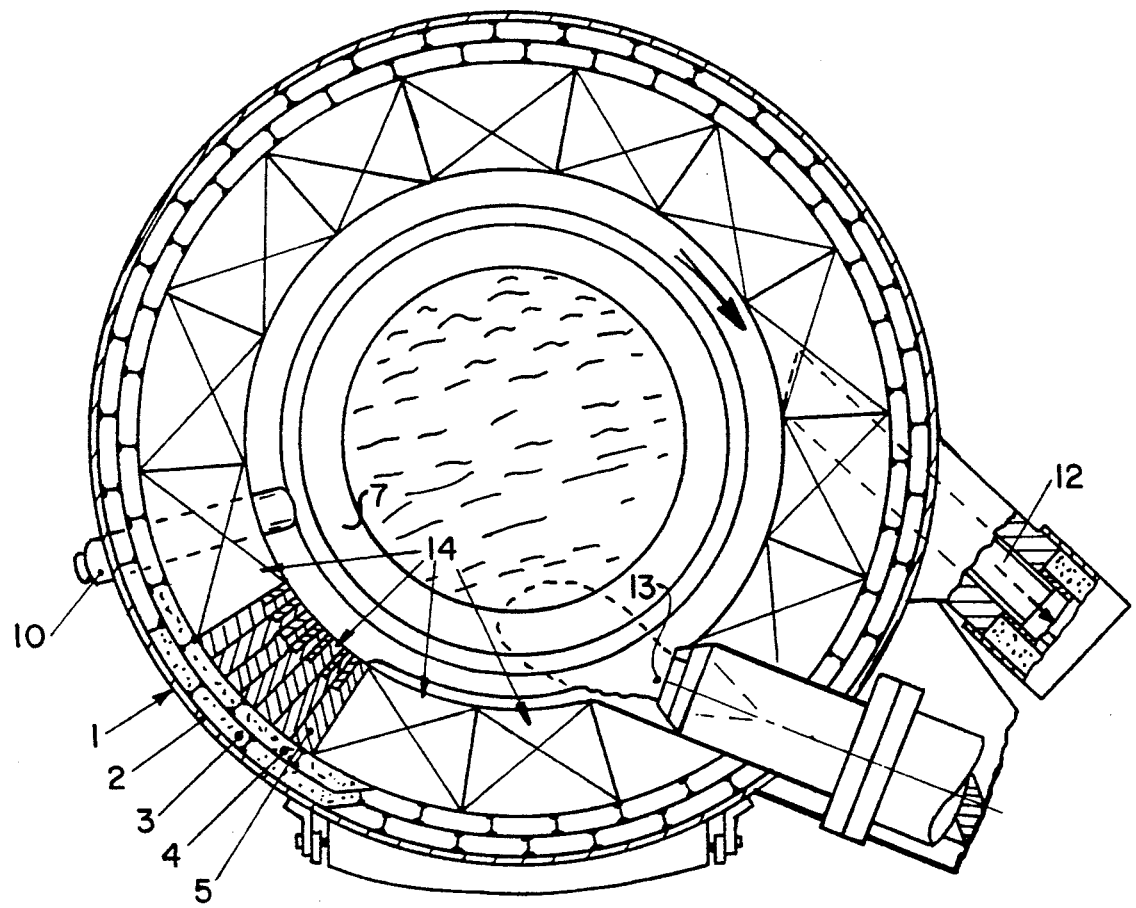
FIG. 2 shows a sectional view along the line II—II from FIG. 1.
Figure 3:
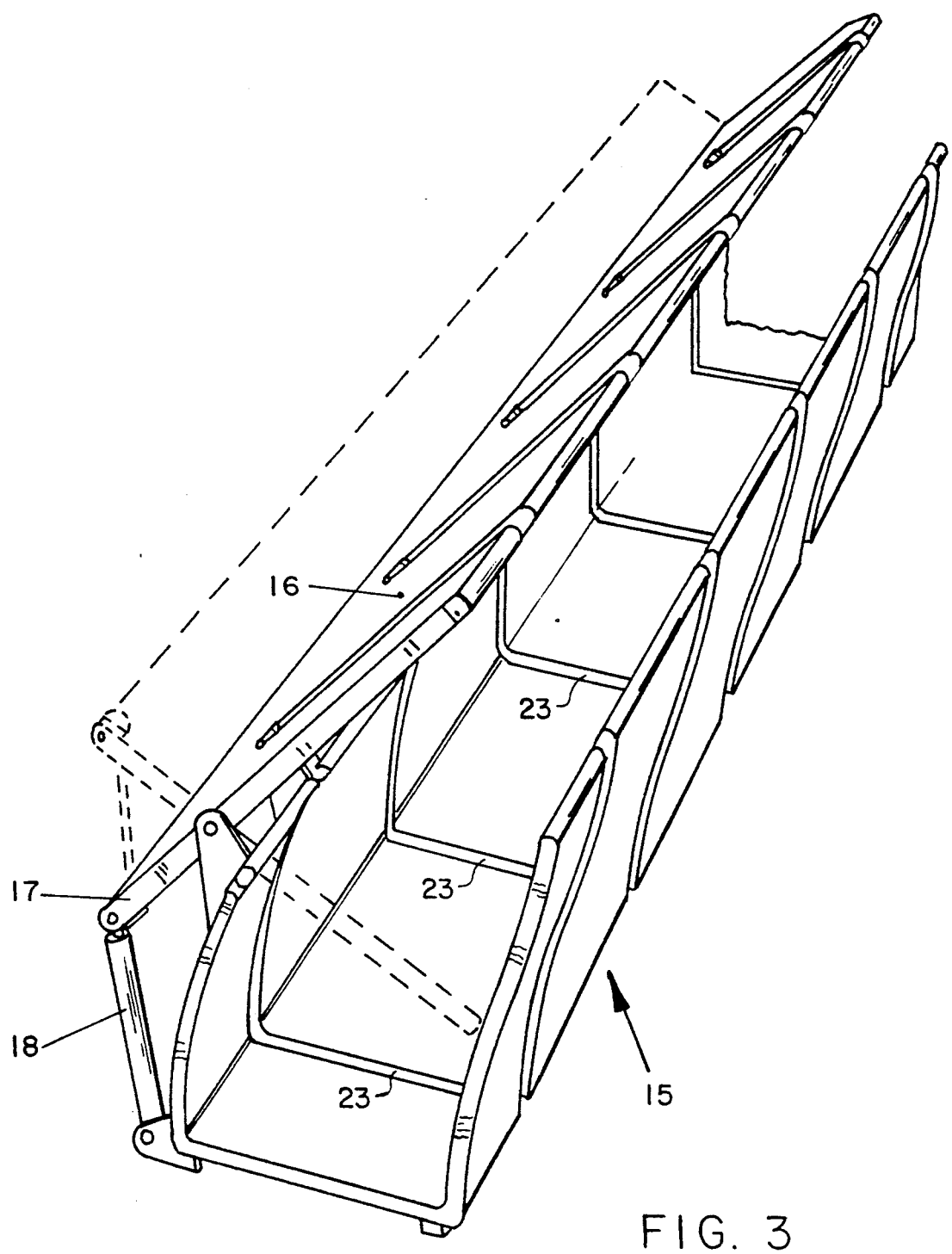
FIG. 3 shows a press for pressing the blocks of ceramic fiber material.

The insulating layer of ceramic fiber 5 is built up of vertical blocks, for instance 14, that are trapezium form in section (FIG. 6). Such blocks are manufactured in a press 15 (FIG. 3). The press 15 contains a movable valve 16 which is actuated by an angle lever system 17, 18. The strips 19, 19', 19''... are placed in the press, whereby cross strips 20, 20', 20''... are positioned on the convex side between the strips 19, 19', 19''... (FIG. 4). After pressing (FIG. 5) a greater density results in the convex zone 21 than on the zone 22 located more to the outside. Arranged in the press are groove-like peripheral recesses 23, 23', 23''... in which is placed binding or strapping material in the form of wire or cord 24. After pressing the different cords 24 are tied in position. The thus formed blocks are disposed vertically along the cylindrical shell (see FIG. 2 and 6). After the whole peripheral wall is provided in this manner with blocks the strappings of the various blocks are cut through, which results in the blocks expanding and abutting one another precisely, thereby filling up all the connecting seams between the successive blocks.

The furnace is built up of a hat consisting of the cylindrical peripheral shell which is closed off at the top by an upper surface 25 that is insulated in the same manner as the side walls. The said hat is positioned loosely on a base plate 27 which is likewise insulated in the same way as the side walls. The very weight of the hat is sufficient for sealing relative to base plate 27. The whole stands on a grid 28 which rests on the ground with legs 29 such that the whole can be lifted up by a fork-lift truck.

The thus constructed furnace is sprayed on the interior, for example with a sort of water-glass, and subsequently heated to approximately 1500° C. After this temperature has been reached, rapid cooling to about 1250° C. is carried out. Achieved as a result is the melting of the surface structure of the ceramic fibres on the hot side (the interior of the wall). This takes place in the micro-structure of the ceramic fibre. During this process the water-glass holds together the small pieces of ceramic fibre before they begin to melt. This surface treatment may be called glazing only so deep as sprayed solution would penetrate the body of a block. Thereby obtained is a heat reflecting surface layer that is fire resistant, while the rest of the ceramic fibre blocks remain soft, therefore preserving high thermal insulating properties.

Glass pots that are placed in a glass furnace and in which the glass for melting is placed have to be brought to temperature gradually. Too rapid temperature changes result in a considerable lessening in the useful life of such glass pots. Glass pots are generally preheated in a tempering oven other than the glass-melting furnace (arch oven). In accordance with the invention the useful life of glass pots can be extended considerably.

Figure 7:
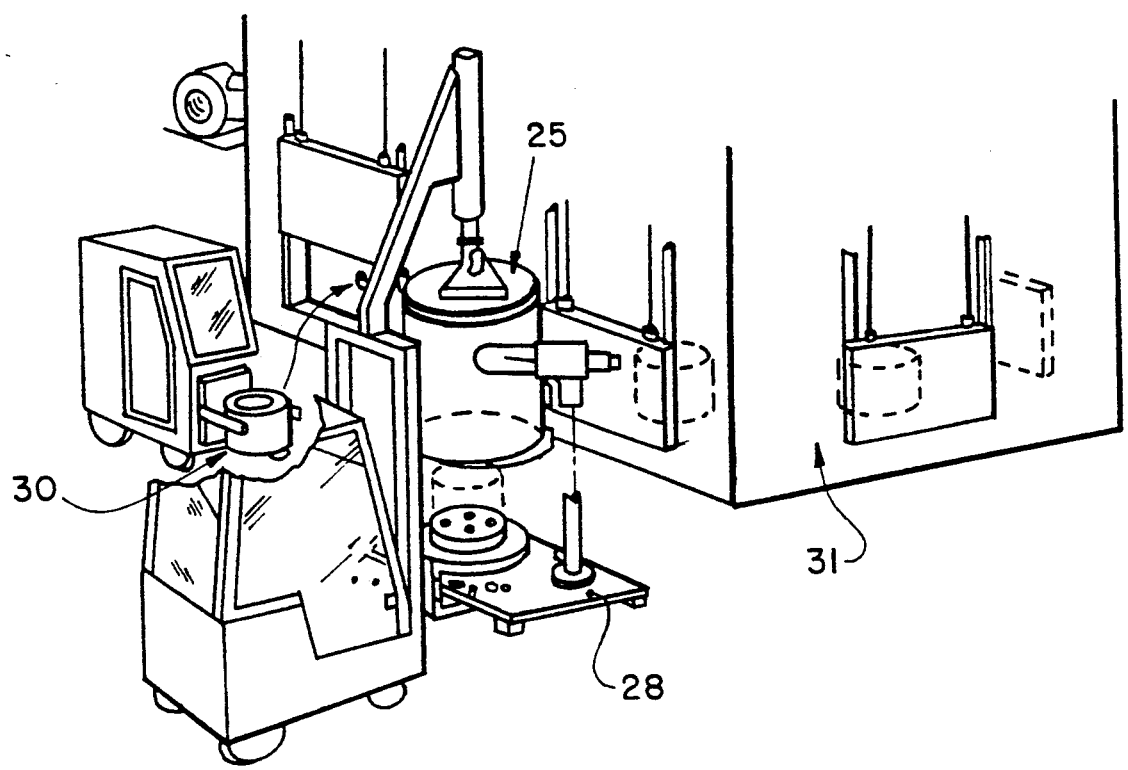
FIG. 7 shows in perspective view the manner of removal of a glass pot and the placing thereof in the furnace according to the invention.

This is achieved by employing a tempering oven built according to the same principle like glassmelting furnace by which the exchange of pots is happening within 30 seconds, which considerably decreases the time needed compared to traditional systems (see FIG. 7). During insertion or removal of the glass pot the tempering oven is disconnected from the gas supply for the burner and from the connection with the discharge for the combustion gases. The tempering oven together with the grid 28 is then lifted using a fork-lift truck and transported to a point close to the opening doors of the furnace into which the glass pot has to be placed. Using a lifting device the hat of the tempering oven, consisting of a cylindrical shell and the top plate 25, is then raised and optionally set in inclined position. The pot can subsequently be removed from the tempering oven using a forked body 30 and placed in the glass melting furnace 31. All this can be carried out very rapidly, which results in a possibility to keep the period, during which the glass pot is exposed to a considerably lower temperature, limited (30 seconds).

With the arch ovens known up to the present time which are not transportable because of their great weight and stationary character, a much longer period of time is needed during which the glass pot is exposed to a much different temperature. The useful life of the glass pot is therefore considerably shorter and at the same time it is possible to reach the temperature of tight burning.

It is noted that the manner of insulating a cylindrical body as employed with the glass melting furnace and arch oven according to the invention may also be applied in other fields.

Figure 8:
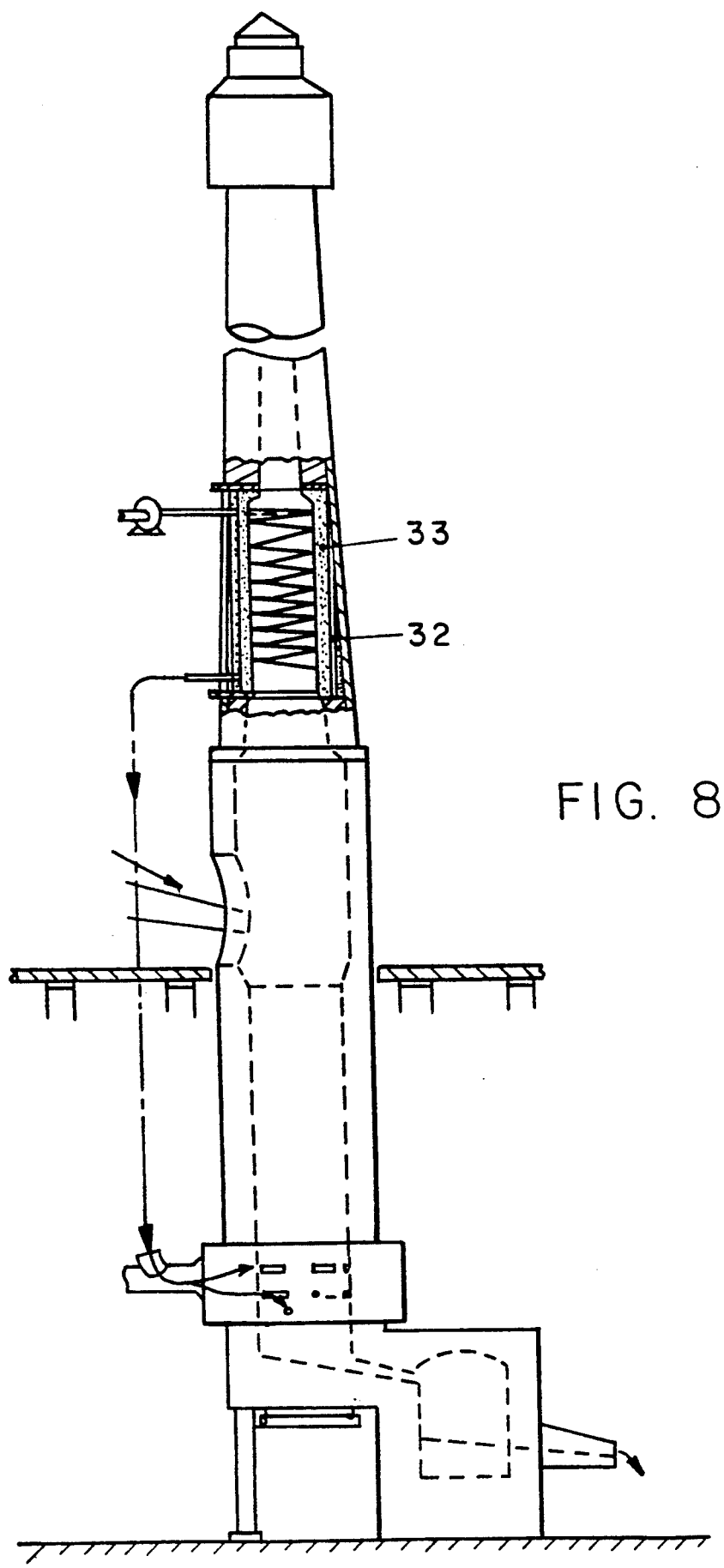
FIG. 8 shows a cylindrical insulating arrangement for a heat exchanger for recovering energy from waste gases, for instance from a blast-furnace.

FIG. 8 shows such an insulated cylinder as part of a chimney of a blast-furnace. Arranged inside the cylindrical part 32 is a heat exchanger 33 which recovers the thermal energy in the waste gases of the blast-furnace. Due to the good insulation little heat is lost to the outside. As a result of the light construction it is possible to arrange such a cylindrical shell at a height. Such is not possible using the classical lining of furnaces, chimneys and the like with mortar laid brick walls.

I claim:

1. A method for thermally insulating a high temperature furnace, such as a glass furnace, comprising the steps of:
   (a) arranging layers of insulating material on an interior wall of a furnace shell;
   (b) applying ceramic fibre material to said layers of insulating material according to the following:
      (1) pressing and strapping up the fibre material into vertical blocks of trapezium form section;
      (2) disposing said blocks in abutment with one another against the interior wall such that the whole interior wall is covered; and
      (3) removing the strapping of the individual blocks and allowing the blocks to expand;
   (c) applying water-glass to said ceramic fibre material;
   (d) melting the surface structure of the ceramic fibre material by heating the furnace; and
   (e) rapidly cooling said furnace;
   whereby a heat reflecting surface is formed on an inward surface of said ceramic fibre material.

2. The method of claim 1, wherein said blocks are pressed from parallel strips of material.

3. The method of claim 2, including the step of arranging additional strips of material to be pressed into a convex side of the blocks.

4. The method of claim 1, including the step or arranging the layers of insulating material in overlapping manner.

5. The method of claim 1, wherein step (d) includes heating the furnace to approximately 1500° C. and step (e) includes cooling the furnace to approximately 1250° C.

* * * * *

UNITED STATES PATENT AND TRADEMARK OFFICE
CERTIFICATE OF CORRECTION

PATENT NO. : 5,257,929
DATED : November 2, 1993
INVENTOR(S) : Milutin Gnjatovic

It is certified that error appears in the above-indentified patent and that said Letters Patent is hereby corrected as shown below:

Column 2, Lines 34-35 "BRIEF DESCRIPTION OF THE PREFERRED EMBODIMENTS" should read --BRIEF DESCRIPTION OF THE DRAWINGS--.

Column 2, Line 39 "invention." should read --invention,--.

Column 2, Line 43 "material." should read --material,--.

Claim 4, Line 61, Column 4 "or" should read --of-- (second occurrence).

Signed and Sealed this

Fifth Day of April, 1994

BRUCE LEHMAN

*Attest:*

*Attesting Officer*     *Commissioner of Patents and Trademarks*